United States Patent
Ishibashi et al.

(10) Patent No.: US 7,846,810 B2
(45) Date of Patent: Dec. 7, 2010

(54) METHOD OF MEASURING WARPAGE OF REAR SURFACE OF SUBSTRATE

(75) Inventors: Keiji Ishibashi, Itami (JP); Noriko Tanaka, Itami (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 165 days.

(21) Appl. No.: 12/341,082

(22) Filed: Dec. 22, 2008

(65) Prior Publication Data

US 2009/0112512 A1    Apr. 30, 2009

Related U.S. Application Data

(63) Continuation of application No. 11/706,331, filed on Feb. 15, 2007, now Pat. No. 7,494,892.

(30) Foreign Application Priority Data

Feb. 15, 2006 (JP) ............................. 2006-038647
Dec. 28, 2006 (JP) ............................. 2006-355597

(51) Int. Cl.
    *H01L 21/76* (2006.01)
(52) U.S. Cl. ..................................... 438/401
(58) Field of Classification Search ........................ None
    See application file for complete search history.

(56) References Cited

U.S. PATENT DOCUMENTS 6,323,952 B1    11/2001    Yomoto et al.
6,731,391 B1 *   5/2004    Kao et al. ................... 356/605
2004/0090639 A1  5/2004    Kubo et al.
2005/0109743 A1  5/2005    Tanabe et al.
2007/0166945 A1 * 7/2007   Tanabe et al. ............... 438/401

OTHER PUBLICATIONS

Chinese Office Action, with English translation, issued in Chinese Patent Application No. 200710005974.9, mailed Jul. 17, 2009.
Edited by Yoshiaki Matsushita et al., "Superprecision Wafer Surface Control Technology," 1st Edition, Feb. 28, 2000, pp. 258-264, pp. 272-278, Published by Science Forum Inc.
"Wafer Geometry Characteristics" XP-002428986, dated Jul. 24, 2004.
European Search Report dated Apr. 26, 2007.

* cited by examiner

*Primary Examiner*—Charles D Garber
*Assistant Examiner*—Andre' C Stevenson
(74) *Attorney, Agent, or Firm*—McDermott Will & Emery LLP

(57) ABSTRACT

A method of measuring warpage of a rear surface of a substrate includes a substrate detection step, a best fit plane calculation step, and a warpage calculation step. Further, the method of measuring warpage of a rear surface of a substrate can further includes after the substrate detection step and before the best fit plane calculation step: a noise removal step and an outer peripheral portion removal step; the outer peripheral portion removal step and a smoothing step; or the noise removal step, the outer peripheral portion removal step, and the smoothing step. Thereby, a method of measuring warpage of a rear surface with a high surface roughness of a substrate can be provided.

2 Claims, 9 Drawing Sheets

FIG.5A

| f(a−1,b+1) | f(a,b+1) | f(a+1,b+1) |
|---|---|---|
| f(a−1,b) | f(a,b) | f(a+1,b) |
| f(a−1,b−1) | f(a,b−1) | f(a+1,b−1) |

FIG.5B

| 0.96 | 0.98 | 0.96 |
|---|---|---|
| 0.98 | 1.00 | 0.98 |
| 0.96 | 0.98 | 0.96 |

$\sigma=5$
BEFORE NORMALIZATION

FIG.5C

| 0.110 | 0.112 | 0.110 |
|---|---|---|
| 0.112 | 0.114 | 0.112 |
| 0.110 | 0.112 | 0.110 |

$\sigma=5$
AFTER NORMALIZATION

METHOD OF MEASURING WARPAGE OF REAR SURFACE OF SUBSTRATE

RELATED APPLICATION

This application is a Continuation of U.S. application Ser. No. 11/706,331, filed Feb. 15, 2007 now U.S. Pat. No. 7,494,892, claiming priority of Japanese Application Nos. 2006-038647, filed Feb. 15, 2006 and 2006-355597, filed Dec. 28, 2006, the entire contents of each of which are hereby incorporated by reference.

BACKGROUND OF THE INVENTION

1. Field of the Invention

The present invention relates to a method of measuring warpage of a rear surface of a substrate used in a semiconductor device or the like, and more specifically, to a method of measuring warpage of a rear surface (a surface opposite to a crystal growth surface; hereinafter the same applies) of a substrate using a laser displacement meter.

2. Description of the Background Art

In a substrate used in a semiconductor device or the like, it is necessary to form one or more semiconductor layers having good quality on the substrate in order to obtain a semiconductor device having excellent properties. Accordingly, the substrate is required to have a crystal growth surface with reduced warpage and surface roughness. The warpage of the crystal growth surface can be measured by a flatness tester employing optical interferometry, and the surface roughness of the crystal growth surface can be measured by a 3D-SEM (three-dimensional scanning electron microscope; hereinafter the same applies) or the like (see for example "Superprecision Wafer Surface Control Technology" by Yoshiaki Matushita et al., the first edition, Science Forum Inc., Feb. 28, 2000, pages 258-264 and 272-278 (Non-Patent Document 1)).

In order to form one or more semiconductor layers having good quality on the substrate, the substrate is required to not only have a crystal growth surface with reduced warpage and surface roughness, but also have a rear surface with reduced warpage and surface roughness. If the rear surface has large warpage and surface roughness, this causes an increase in a gap portion formed between the rear surface of the substrate and a susceptor (meaning a table on which a substrate is disposed; hereinafter the same applies) when a semiconductor layer is formed on the crystal growth surface of the substrate. As a result, heat transferred from the susceptor to the substrate is unevenly distributed, and the semiconductor layer cannot be formed evenly and stably on the crystal growth surface of the substrate. Consequently, a semiconductor layer having good quality cannot be formed.

Consequently, in order to prepare a substrate suitable for fabrication of a semiconductor device, it is necessary to evaluate not only warpage and surface roughness of a crystal growth surface of a substrate but also warpage and surface roughness of a rear surface of the substrate. The surface roughness of the rear surface can be measured by a 3D-SEM or the like.

However, the rear surface has a surface roughness greater than that of the crystal growth surface, and it often has a surface roughness Ra of not less than 50 nm. Accordingly, it is difficult to measure the warpage of the rear surface by a flatness tester employing optical interferometry. Further, since the flatness tester employing optical interferometry cannot obtain a reflected beam, it cannot provide data analysis.

Therefore, there has been a strong need to develop a method of measuring warpage of a rear surface of a substrate in order to fabricate a semiconductor device having excellent properties.

SUMMARY OF THE INVENTION

One object of the present invention is to provide a method of measuring warpage of a rear surface of a substrate.

The present invention is a method of measuring warpage of a rear surface opposite to a crystal growth surface of a substrate using a laser displacement meter, the substrate being disposed on a substrate support table, including: a substrate detection step detecting a plurality of displacement values respectively corresponding to a plurality of measurement points on the rear surface of the substrate using the laser displacement meter; a noise removal step removing noise contained in the plurality of displacement values; an outer peripheral portion removal step calculating a plurality of displacement values for calculation by removing from the plurality of displacement values those respectively corresponding to the measurement points in an outer peripheral portion of the substrate; a smoothing step smoothing the plurality of displacement values for calculation to calculate a warped surface; a best fit plane calculation step calculating a best fit plane having the minimum distance to the warped surface; and a warpage calculation step calculating as warpage a sum of a distance from the best fit plane to a point represented by the greatest displacement value of the warped surface on one side with respect to the best fit plane and a distance from the best fit plane to a point represented by the greatest displacement value of the warped surface on the other side with respect to the best fit plane.

In the method of measuring warpage of a rear surface of a substrate in accordance with the present invention, the substrate can be disposed on the substrate support table having three supporting portions such that the crystal growth surface of the substrate is supported by the three supporting portions. Further, the substrate detection step can be performed by measuring distances between the laser displacement meter and the plurality of measurement points on the rear surface by a laser focus technique while moving the substrate support table on which the substrate is disposed in a two-dimensional direction in a stepwise fashion. Further, the noise removal step can be performed using a median filter. Furthermore, the smoothing step can be performed using a Gaussian filter. Further, the best fit plane calculation step can be performed by calculating the best fit plane to minimize a sum of squares of every distance between the best fit plane and each point represented by each of the plurality of displacement values for calculation subjected to the smoothing.

Furthermore, in the method of measuring warpage of a rear surface of a substrate in accordance with the present invention, an optimization cycle including the smoothing step, the best fit plane calculation step, and the warpage calculation step can be repeated one or more times. Further, at least one noise removal step can be included in an interval between the repeated optimization cycles, or after the smoothing step in the optimization cycle.

Further, the present invention is a method of measuring warpage of a rear surface opposite to a crystal growth surface of a substrate using a laser displacement meter, the substrate being disposed on a substrate support table, including: a substrate detection step detecting a plurality of displacement values respectively corresponding to a plurality of measurement points on the rear surface of the substrate using the laser displacement meter; a best fit plane calculation step calculating a best fit plane having the minimum distance to a plurality of points respectively represented by the plurality of displacement values; and a warpage calculation step calculating as warpage a sum of a distance from the best fit plane to a point represented by the greatest displacement value on one side with respect to the best fit plane and a distance from the best fit plane to a point represented by the greatest displacement value on the other side with respect to the best fit plane, in the plurality of points respectively represented by the plurality of displacement values.

Further, the method of measuring warpage of a rear surface of a substrate in accordance with the present invention can further include after the substrate detection step and before the best fit plane calculation step: a noise removal step removing noise contained in the plurality of displacement values; and an outer peripheral portion removal step calculating a plurality of displacement values for calculation by removing from the plurality of displacement values those respectively corresponding to the measurement points in an outer peripheral portion of the substrate, and can use the plurality of displacement values for calculation as the plurality of displacement values in the best fit plane calculation step and the warpage calculation step. On this occasion, the noise removal step can be performed using a median filter.

Further, the method of measuring warpage of a rear surface of a substrate in accordance with the present invention can further include after the substrate detection step and before the best fit plane calculation step: an outer peripheral portion removal step calculating a plurality of displacement values for calculation by removing from the plurality of displacement values those respectively corresponding to the measurement points in an outer peripheral portion of the substrate; and a smoothing step smoothing the plurality of displacement values for calculation to calculate a warped surface, and can use the plurality of points respectively represented by the plurality of displacement values for calculation subjected to smoothing on the warped surface as the plurality of points respectively represented by the plurality of displacement values in the best fit plane calculation step and the warpage calculation step. On this occasion, the smoothing step can be performed using a Gaussian filter.

Further, in the method of measuring warpage of a rear surface of a substrate in accordance with the present invention, the substrate can be disposed on the substrate support table having three supporting portions such that the crystal growth surface of the substrate is supported by the three supporting portions. Further, the substrate detection step can be performed by measuring distances between the laser displacement meter and the plurality of measurement points on the rear surface by a laser focus technique while moving the substrate support table on which the substrate is disposed in a two-dimensional direction in a stepwise fashion.

According to the present invention, a method of measuring warpage of a rear surface of a substrate can be provided.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 5A is a schematic view of a kernel for an 8-neighborhood Gaussian filter illustrating positions at which Gaussian functions f(x, y) serving as coefficients are arranged.

FIG. 5B is a schematic view of a kernel for an 8-neighborhood Gaussian filter illustrating an arrangement of coefficients with $\sigma=5$ before normalization.

FIG. 5C is a schematic view of a kernel for an 8-neighborhood Gaussian filter illustrating an arrangement of coefficients with $\sigma=5$ after normalization.

DESCRIPTION OF THE PREFERRED EMBODIMENTS

First Embodiment

Figure 1:
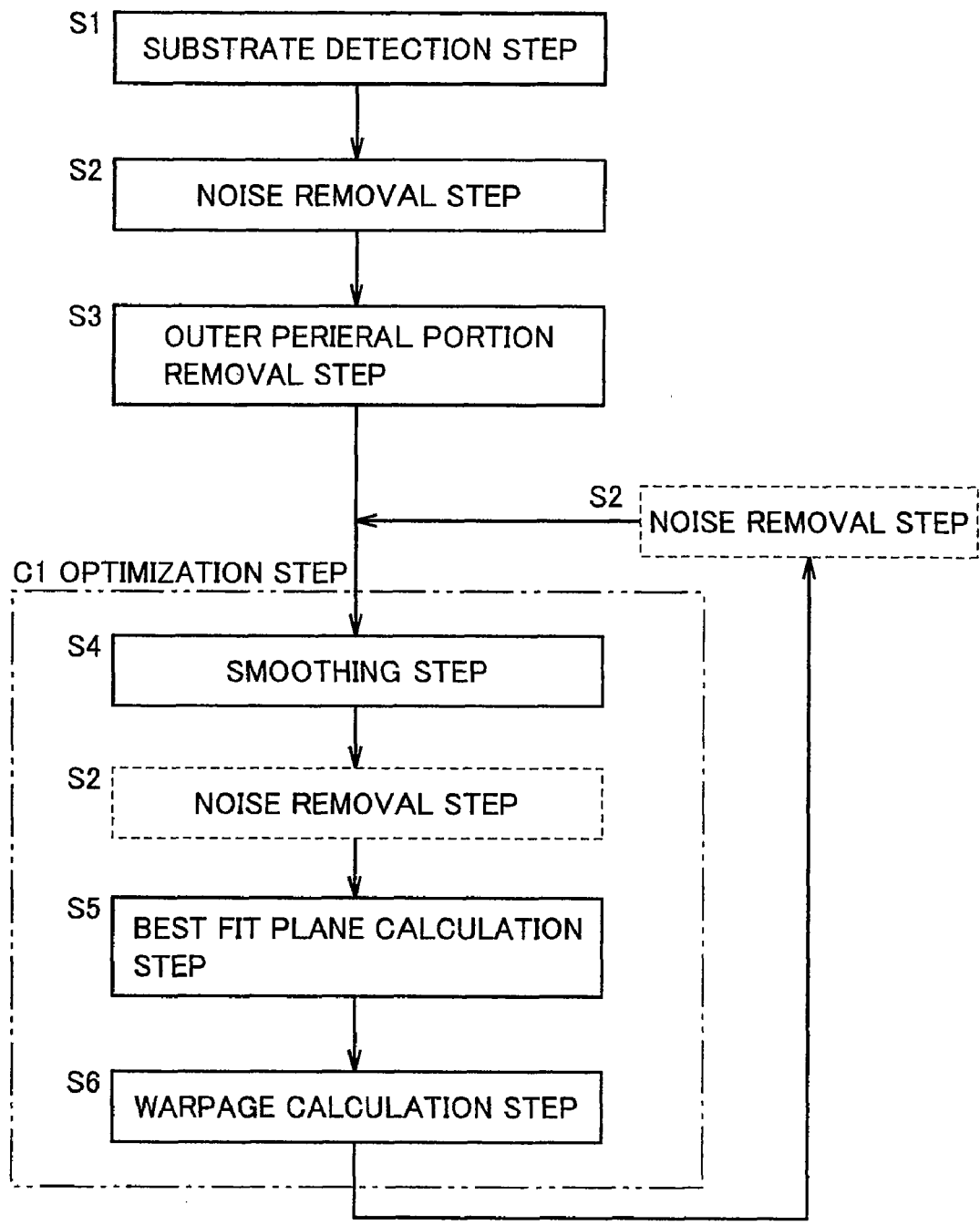
FIG. 1 is a flow chart illustrating an example of a method of measuring warpage of a rear surface of a substrate in accordance with the present invention.

Referring to FIG. 1, one embodiment of a method of measuring warpage of a rear surface of a substrate in accordance with the present invention is a method of measuring warpage of a rear surface opposite to a crystal growth surface of a substrate using a laser displacement meter, the substrate being disposed on a substrate support table. The method includes: a substrate detection step S1 detecting a plurality of displacement values respectively corresponding to a plurality of measurement points on the rear surface of the substrate using the laser displacement meter; a noise removal step S2 removing noise contained in the plurality of displacement values; an outer peripheral portion removal step S3 calculating a plurality of displacement values for calculation by removing from the plurality of displacement values those respectively corresponding to the measurement points in an outer peripheral portion of the substrate; a smoothing step S4 smoothing the plurality of displacement values for calculation to calculate a warped surface; a best fit plane calculation step S5 calculating a best fit plane having the minimum distance to the warped surface; and a warpage calculation step S6 calculating as warpage a sum of a distance from the best fit plane to a point represented by the greatest displacement value of the warped surface on one side with respect to the best fit plane and a distance from the best fit plane to a point represented by the greatest displacement value of the warped surface on the other side with respect to the best fit plane. With the measurement method described above, even for a substrate having a rear surface with a high surface roughness (for example, with a surface roughness Ra of not less than 50 nm), the warpage of the rear surface of the substrate can be measured. It is to be noted that surface roughness Ra is a value obtained by sampling a portion having a reference length from a roughness curve in a direction of its mean line, summing up absolute values of deviations from a mean line of the sampled portion to a measurement curve, and calculating an average for the reference length.

Further, in FIG. 1, the step surrounded with a solid frame is an indispensable step, and the step surrounded with a dashed frame is an arbitrary step. While the present embodiment and FIG. 1 describe the case where the outer peripheral portion removal step S3 is performed after the noise removal step S2, these steps may be performed in inverse order.

Figure 2:
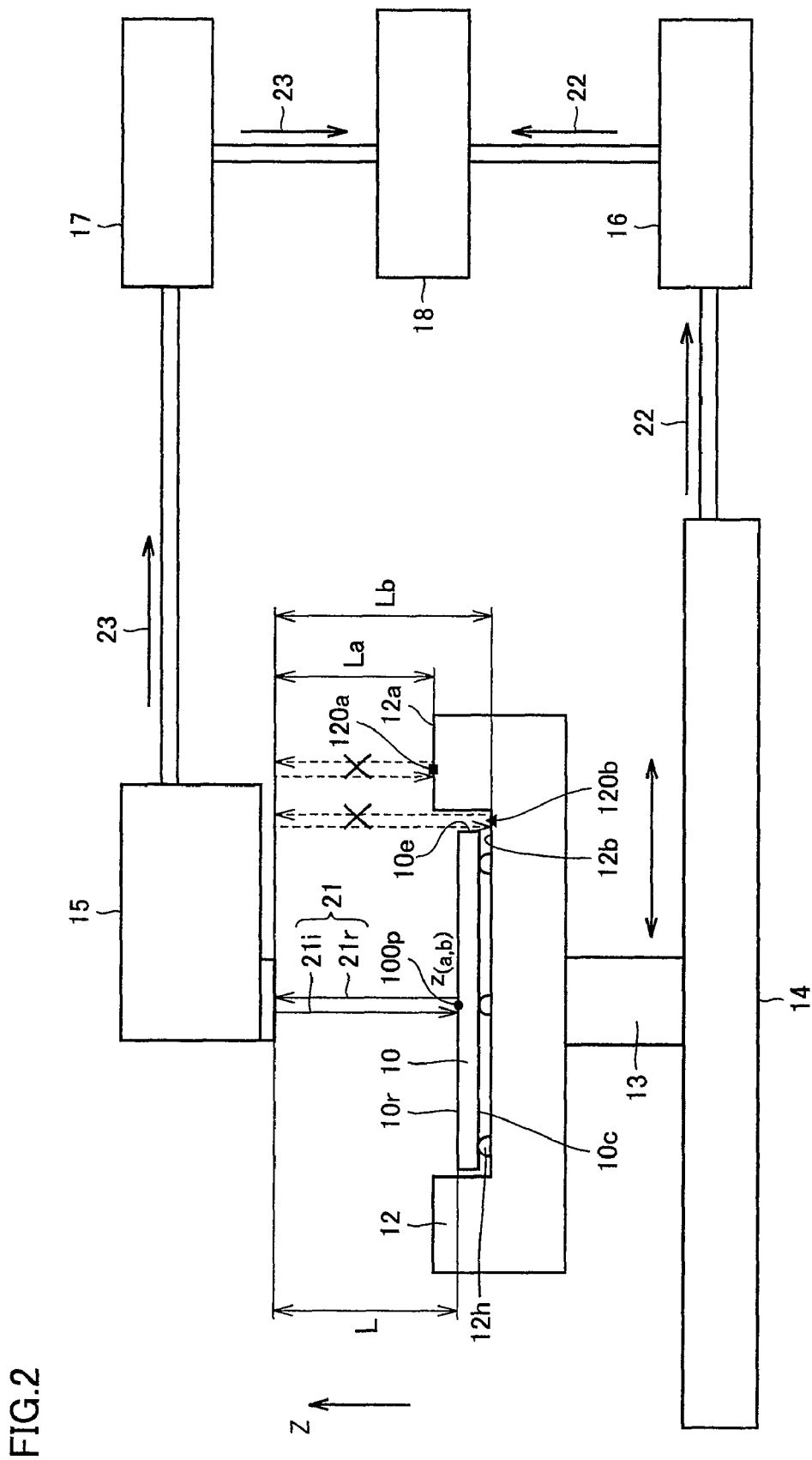
FIG. 2 is a schematic view showing a measuring apparatus used in the method of measuring the warpage of the rear surface of the substrate in accordance with the present invention.

Turning to FIG. 2, a laser displacement meter 15 is an apparatus measuring a displacement of a rear surface 10r of a substrate 10 by applying a laser beam 21 on rear surface 10r of substrate 10. There is no particular limitation on the type of the laser, and for example a red color semiconductor laser having a wavelength of 670 nm is used. There is no particular limitation on the measuring technique, and for example a laser focus technique is used. Although a laser displacement meter employing the laser focus technique has a lower measuring accuracy than a flatness tester employing optical interferometry, it can measure a rough rear surface with surface roughness Ra of not less than 50 nm. The measuring accuracy of the laser displacement meter can be improved by using a blue color semiconductor laser having a wavelength shorter than that of a red color semiconductor laser. Further, unlike the flatness tester employing optical interferometry, the laser displacement meter employing the laser focus technique can obtain a reflected beam 21r, and thus it can analyze and process a displacement value.

Figure 3:
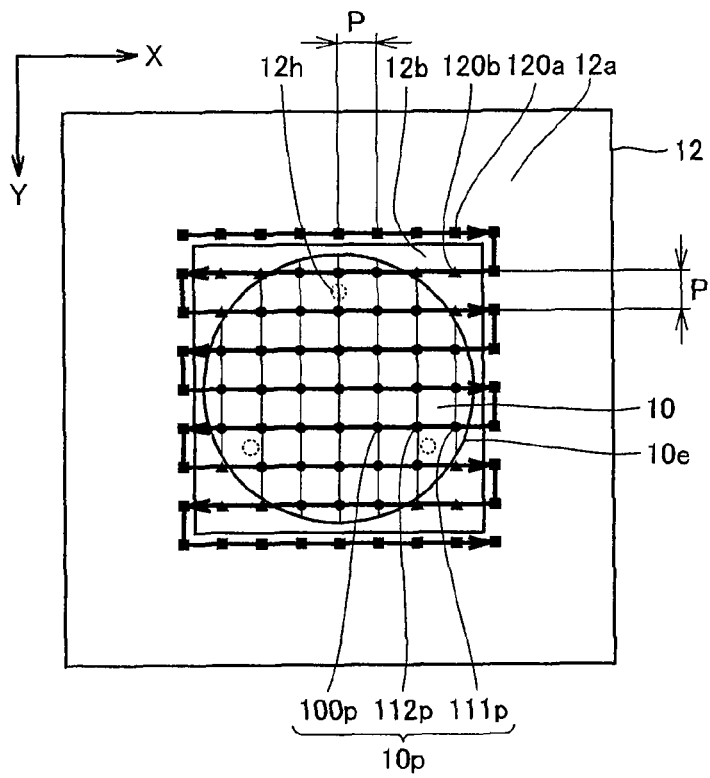
FIG. 3 is a schematic plan view showing a plurality of measurement points in the method of measuring the warpage of the rear surface of the substrate in accordance with the present invention.

Referring to FIGS. 2 and 3, substrate 10 is disposed on a substrate support table 12. Although there is no particular limitation on how to dispose substrate 10 on substrate support table 12, substrate 10 is preferably disposed on substrate support table 12 having three supporting portions 12h such that a crystal growth surface 10c of substrate 10 is supported by the three supporting portions 12h. Supporting an outer peripheral portion of crystal growth surface 10c of substrate 10 only by the three supporting portions 12h can minimize damage to crystal growth surface 10c during the measurement of warpage. Further, even when substrate 10 is inclined while being supported by the above three portions, the inclination of substrate 10 can be compensated for by calculating a best fit plane having the minimum distance to a warped surface (meaning a curved surface indicating warpage of a rear surface; hereinafter the same applies), and calculating a distance from the best fit plane to the warped surface.

Referring to FIGS. 1 to 3, although there is no particular limitation on the substrate detection step S1, the step can be performed by measuring a distance L between laser displacement meter 15 and rear surface 10r of substrate 10 while moving substrate 10 in a two-dimensional direction (meaning an X direction and a Y direction in FIG. 3; hereinafter the same applies) in a stepwise fashion. The stepwise movement of substrate 10 in the two-dimensional direction can be performed by moving a driving portion 13 coupling substrate support table 12 to a driving unit 14 in the two-dimensional direction in a stepwise fashion. Driving unit 14 is controlled by a position controlling unit 16.

On this occasion, position data in the two-dimensional direction of a measurement point 100p (an arbitrarily specified measurement point) irradiated with laser beam 21 among the plurality of measurement points on the rear surface of the substrate is collected to a data analysis unit 18 via position controlling unit 16. Here, an arrow 22 indicates a direction in which the position data is transmitted.

While there is no particular limitation on how to measure distance L, it can for example be measured by the laser focus technique. The laser focus technique will now be described below. An incident beam 21i emitted from a light source in laser displacement meter 15 is applied to arbitrarily specified measurement point 100p on rear surface 10r of substrate 10 via an objective lens (not shown) moved up and down at a high speed within laser displacement meter 15 by means of a tuning fork. Reflected beam 21r from arbitrarily specified measurement point 100p passes through a pin hole (not shown) in laser displacement meter 15 and reaches a light receiving element (not shown). According to the confocal principle, when incident beam 21i is focused on arbitrarily specified measurement point 100p on rear surface 10r of substrate 10, reflected beam 21r is focused into one point at a position of the pin hole and enters the light receiving element. By measuring a position of the turning fork on this occasion with a sensor (not shown), distance L between laser displacement meter 15 and arbitrarily specified measurement point 100p on rear surface 10r of substrate 10 can be measured. With this manner, a displacement value $Z_{(a,\ b)}$ (meaning a displacement value in a Z direction; hereinafter the same applies) of arbitrarily specified measurement point 100p on rear surface 10r of substrate 10 can be measured.

On this occasion, displacement value data of arbitrarily specified measurement point 100p among a plurality of measurement points 10p on rear surface 10r of substrate 10 is collected to data analysis unit 18 via a laser displacement meter controlling unit 17. Here, an arrow 23 indicates a direction in which the displacement value data is transmitted.

Next, the above measurement is performed after the substrate is moved in a stepwise fashion (for example in the X direction or the Y direction at a constant pitch P) as shown in FIGS. 2 and 3, and thus the position data in the two-dimensional direction (the X direction and the Y direction) and the displacement value data in the Z direction of a measurement point adjacent to arbitrarily specified measurement point 100p at pitch P can be obtained. Through repeating the above operation, the position data in the two-dimensional direction (the X direction and the Y direction) and the displacement value data in the Z direction of each of the plurality of measurement points 10p on rear surface 10r of substrate 10 can be obtained. The position data in the two-dimensional direction (the X direction and the Y direction) and the displacement value data in the Z direction obtained as described above are collected to data analysis unit 18.

As shown in FIG. 3, when substrate 10 of a circular shape is moved in a stepwise fashion at constant pitch P in the two-dimensional direction (the X direction and the Y direction), there may be a case where the laser beam is applied to substrate support table 12 instead of rear surface 10r of substrate 10. As shown in FIG. 3, when substrate 10 is disposed in a concave portion of substrate support table 12, there may be a measurement point 120a on a surface 12a of a non-concave portion of substrate support table 12, and a measurement point 120b on a surface 12b of the concave portion of substrate support table 12.

In such a case, referring to FIG. 2, the plurality of displacement values respectively corresponding to the plurality of measurement points 10p on rear surface 10r of substrate 10 can be detected with measurement points 120a and 120b removed as described below. Specifically, measurement points 120a and 120b can be removed by detecting only arbitrarily specified measurement point 100p which has distance L to laser displacement meter 15 satisfying the relation La<L<Lb, where La is a distance between laser displacement meter 15 and surface 12a of the non-concave portion of substrate support table 12, and Lb is a distance between laser displacement meter 15 and surface 12b of the concave portion of substrate support table 12. Consequently, the plurality of displacement values respectively corresponding to the plurality of measurement points 10p on rear surface 10r of substrate 10 can be obtained.

Figure 4:
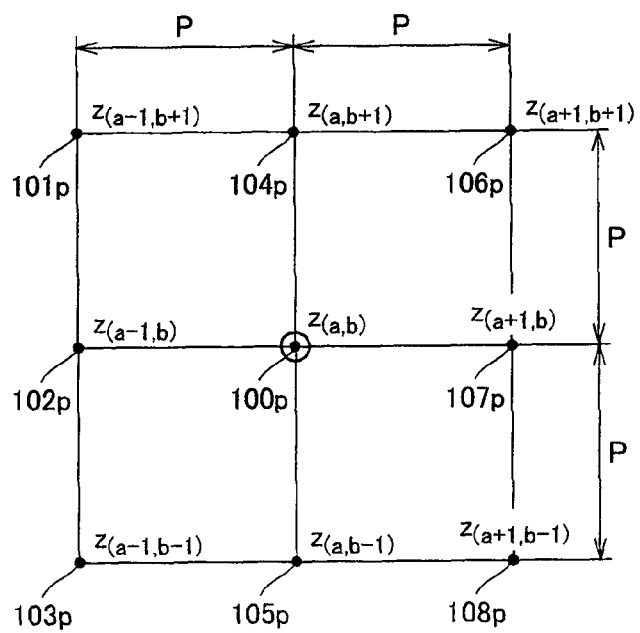
FIG. 4 is a schematic plan view showing an arrangement of the plurality of measurement points.

In the present embodiment, although there is no particular limitation on the noise removal step S2 as long as it removes noise contained in the plurality of displacement values, it is preferable to use a median filter for the step. Referring to FIG. 4, a median filter is a filter replacing a displacement value $z_{(a, b)}$ (meaning a displacement value corresponding to arbitrarily specified measurement point loop; hereinafter the same applies) specified arbitrarily among the plurality of displacement values (meaning the plurality of displacement values respectively corresponding to the plurality of measurement points 10p on rear surface 10r of substrate 10; hereinafter the same applies) by a median obtained when arranging the displacement value $z_{(a, b)}$ and a plurality of displacement values $z_{(a-1, b+1)}$, $z_{(a-1, b)}$, $z_{(a-1, b-1)}$, $z_{(a, b+1)}$, $z_{(a, b-1)}$, $z_{(a+1, b+1)}$, $z_{(a+1, b)}$, and $z_{(a+1, b-1)}$ neighboring the displacement value $z_{(a, b)}$ (meaning displacement values respectively corresponding to a plurality of measurement points 101p, 102p, 103p, 104p, 105p, 106p, 107p, 108p neighboring arbitrarily specified measurement point 100p; hereinafter the same applies) in increasing or decreasing order. In FIG. 4, the displacement value $z_{(a, b)}$ and the plurality of displacement values $z_{(a-1, b+1)}$, $z_{(a-1, b)}$, $z_{(a-1, b-1)}$, $z_{(a, b+1)}$, $z_{(a, b-1)}$, $z_{(a+1, b+1)}$, $z_{(a+1, b)}$, and $z_{(a+1, b-1)}$ neighboring the displacement value $z_{(a, b)}$ are arranged in the two-dimensional direction (the X direction and the Y direction) at constant pitch P.

Although FIG. 4 shows eight displacement values $z_{(a-1, b+1)}$, $z_{(a-1, b)}$, $z_{(a-1, b-1)}$, $z_{(a, b+1)}$, $z_{(a, b-1)}$, $z_{(a+1, b+1)}$, $z_{(a+1, b)}$, and $z_{(a+1, b-1)}$ neighboring and surrounding the arbitrarily specified displacement value as the plurality of neighboring displacement values (such a median filter is called an 8-neighborhood median filter), the number of the plurality of neighboring measuring points is not limited to eight. For example, 24 measuring points neighboring a displacement value can also be used (such a median filter is called an 24-neighborhood median filter).

In the present embodiment, there is no particular limitation on the outer peripheral portion removal step S3 as long as it calculates a plurality of displacement values for calculation by removing from the plurality of displacement values those respectively corresponding to the measurement points in an outer peripheral portion of the substrate. When using an 8-neighborhood median filter in the noise removal step S2, however, referring to FIG. 3, it is preferable to remove displacement values respectively corresponding to at least two measurement points 111p and 112p inward from an outer periphery 10e, as the displacement values respectively corresponding to the measurement points in the outer peripheral portion of substrate 10, from the plurality of displacement values.

This is because, when an 8-neighborhood median filter is used in the noise removal step S2, referring to FIG. 3, at least one of eight displacement values neighboring a displacement value at a position one or two points inward from outer periphery 10e of substrate 10 is a displacement value of surface 12a of the non-concave portion or surface 12b of the concave portion of substrate support table 12, and thus the above noise removal step fails to remove noise. With this manner, the displacement values respectively corresponding to the measurement points in the outer peripheral portion of the substrate are removed from the plurality of displacement values, and the plurality of displacement values for calculation is obtained.

Figure 6A:
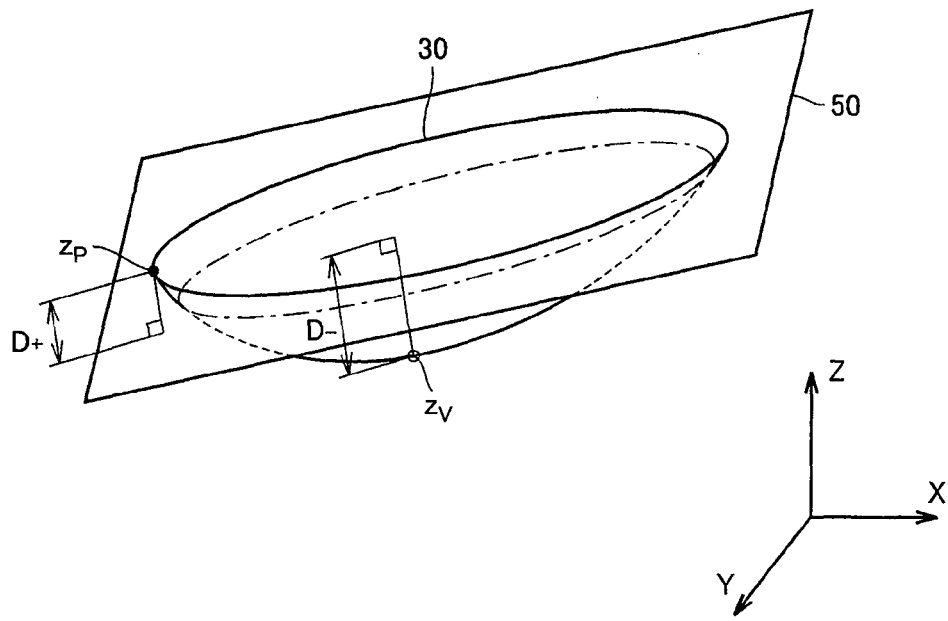
FIGS. 6A and 6B are schematic views showing a warpage calculation step in the method of measuring the warpage of the rear surface of the substrate in accordance with the present invention.
Figure 6B:
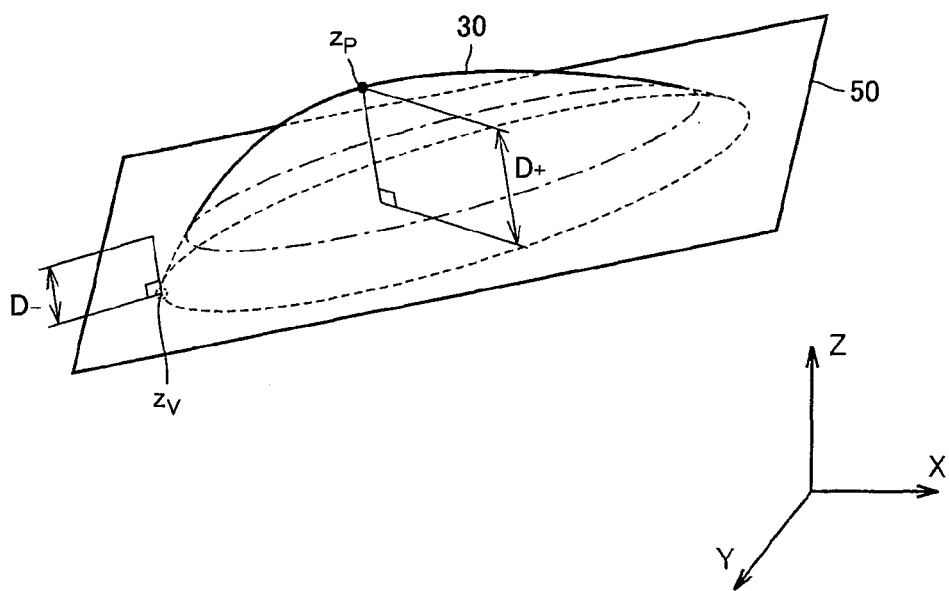

In the present embodiment, referring to FIGS. 6A and 6B, although there is no limitation on the smoothing step S4 as long as it smoothes the plurality of displacement values for calculation to calculate a warped surface 30, it is preferable to use a Gaussian filter for the step. A Gaussian filter is a filter replacing a displacement value $z_{(a, b)}$ specified arbitrarily among the plurality of displacement values for calculation by a weighted average value $z'_{(a, b)}$ of the displacement value $z_{(a, b)}$ and the plurality of displacement values $z_{(a-1, b+1)}$, $z_{(a-1, b)}$, $z_{(a-1, b-1)}$, $z_{(a, b+1)}$, $z_{(a, b-1)}$, $z_{(a+1, b+1)}$, $z_{(a+1, b)}$, and $z_{(a+1, b-1)}$ neighboring the displacement value $z_{(a, b)}$, using a Gaussian function f(x, y) as a weighting factor. With the smoothing described above, even for a rear surface having a high surface roughness (for example, a surface roughness Ra of not less than 50 nm), the warpage of the rear surface can be measured.

The two-dimensional Gaussian function f(x, y) is expressed by the following equation (1):

$$f(x, y) = \frac{1}{N^2} \exp\left\{-\frac{(x-a)^2 + (y-b)^2}{2\sigma^2}\right\} \quad (1)$$

$$= \frac{1}{N^2} \exp\left\{-\frac{(x-a)^2}{2\sigma^2}\right\} \cdot \exp\left\{-\frac{(y-b)^2}{2\sigma^2}\right\}$$

where a and b are coordinate values of an arbitrarily specified measurement point in the X direction and the Y direction, respectively, σ is a standard deviation ($\sigma^2$ is a dispersion), and N is a normalization constant.

As can be seen from equation (1), the greater the distance between a measurement point (x, y) and an arbitrarily specified measurement point (a, b) is, the smaller and less weighted the value of f(x, y) becomes. Further, the greater the value of σ is, the smaller the difference in weighting resulting from the difference in the distance between the measurement point (x, y) and the arbitrarily specified measurement point (a, b) becomes.

Although eight displacement values $z_{(a-1, b+1)}$, $z_{(a-1, b)}$, $z_{(a-1, b-1)}$, $z_{(a, b+1)}$, $z_{(a, b-1)}$, $z_{(a+1, b+1)}$, $z_{(a+1, b)}$, and $z_{(a+1, b-1)}$ neighboring and surrounding an arbitrarily specified displacement value are used in the above as the plurality of neighboring displacement values (such a Gaussian filter is called an 8-neighborhood Gaussian filter), the number of the plurality of neighboring displacement values is not limited to eight. For example, 24 displacement values neighboring a displacement value can also be used (such a Gaussian filter is called an 24-neighborhood Gaussian filter).

Using an 8-neighborhood Gaussian filter specifically means replacing the displacement value $z_{(a, b)}$ specified arbitrarily by the weighted average value $z'_{(a, b)}$ obtained by weighted averaging of the plurality of displacement values $z_{(a-1, b+1)}$, $z_{(a-1, b)}$, $z_{(a-1, b-1)}$, $z_{(a, b+1)}$, $z_{(a, b)}$, $z_{(a, b-1)}$, $z_{(a+1, b+1)}$, $z_{(a+1, b)}$, and $z_{(a+1, b-1)}$ shown in FIG. 4, with each of the values weighted by the Gaussian function f(x, y) (where x=a−1, a, a+1; y=b−1, b, b+1) as a coefficient shown in a kernel (meaning a matrix of coefficients of a filter for displacement values; hereinafter the same applies) of FIG. 5A. Specifically, it means obtaining the value $z'_{(a, b)}$ according to the following equation (2):

$$z'_{(a,b)} = \sum_{x=a-1}^{a+1} \sum_{y=b-1}^{b+1} f(x, y) \cdot z_{(x,y)} \qquad (2)$$

$$= \frac{1}{N^2} \sum_{x=a-1}^{a+1} \sum_{y=b-1}^{b+1} \exp\left\{-\frac{(x-a)^2 + (y-b)^2}{2\sigma^2}\right\} \cdot z_{(x,y)}$$

$$= \frac{1}{N^2} \sum_{x=a-1}^{a+1} \sum_{y=b-1}^{b+1} \exp\left\{-\frac{(x-a)^2}{2\sigma^2}\right\} \cdot \exp\left\{-\frac{(y-b)^2}{2\sigma^2}\right\} \cdot z_{(x,y)}$$

$$\left(\text{where } N^2 = \sum_{x=a-1}^{a+1} \sum_{y=b-1}^{b+1} \exp\left\{-\frac{(x-a)^2}{2\sigma^2}\right\} \cdot \exp\left\{-\frac{(y-b)^2}{2\sigma^2}\right\}\right)$$

The Gaussian function f(x, y) serving as a coefficient of the Gaussian filter is determined by the distance from the measurement point (a, b) of the arbitrarily specified displacement value to the measurement point (x, y) and by standard deviation σ. For example, FIG. 5B illustrates an arrangement of values of coefficients f(x, y) of an 8-neighborhood Gaussian filter with σ=5 before normalization, and FIG. 5C illustrates an arrangement of values of coefficients f(x, y) of an 8-neighborhood Gaussian filter with σ=5 after normalization. Normalization means correcting coefficients f(x, y) of a Gaussian filter such that a sum of the coefficients f(x, y) is 1, while maintaining ratios between the coefficients f(x, y).

Since the Gaussian function is independent of each of the X direction and the Y direction as can be seen from equation (1), equation (2) can be separated into the form of a sum in the X direction and a sum in the Y direction as shown in the following equations (3) and (4), respectively. This supports that applying smoothing with a Gaussian filter to a method of performing data processing on a plurality of displacement values obtained by firstly sampling a displacement value in the X direction and subsequently sampling a displacement value in the Y direction is mathematically reasonable.

$$z'_{(a,y)} = \frac{1}{N} \sum_{x=a-1}^{a+1} \exp\left\{-\frac{(x-a)^2}{2\sigma^2}\right\} \cdot z_{(x,y)} \qquad (3)$$

$$z'_{(a,b)} = \frac{1}{N} \sum_{y=b-1}^{b+1} \exp\left\{-\frac{(y-b)^2}{2\sigma^2}\right\} \cdot z'_{(a,y)} \qquad (4)$$

Further, since the Gaussian function is symmetrical with respect to a point in a plane in the X direction and the Y direction, circular sampling can also be performed. This is supported by the fact that no coefficient of an angle θ is contained in the portion of the weighted exponential function in equation (4) in polar coordinates obtained by subjecting equation (2) to coordinate transformation.

$$z'_{(a,b)} = \frac{1}{N^2} \sum_{\theta} \sum_{r} \exp\left\{-\frac{r^2}{2\theta^2}\right\} \cdot z_{(x,y)} \qquad (5)$$

In the present embodiment, referring to FIGS. 6A and 6B, there is no particular limitation on the best fit plane calculation step S5 as long as it calculates a best fit plane 50 having the minimum distance to warped surface 30. On this occasion, to calculate best fit plane 50 having the minimum distance to warped surface 30 means to calculate best fit plane 50 having the minimum distance to a plurality of points respectively represented by the plurality of displacement values for calculation subjected to smoothing on warped surface 30. It is preferable to calculate best fit plane 50 to minimize a sum of squares of every distance between best fit plane 50 and each point represented by each of the plurality of displacement values for calculation subjected to smoothing on warped surface 30 (least square method). With such a least square method, best fit plane 50 representing average inclination of entire rear surface 10r of substrate 10 supported at three points can be obtained.

Figure 11A:
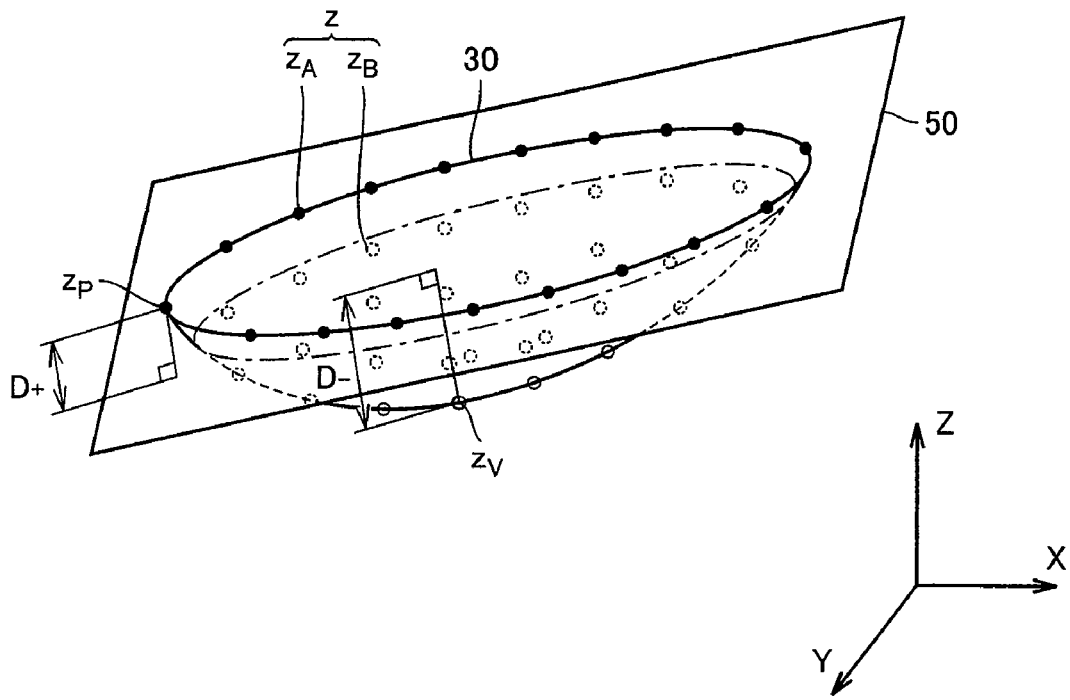
FIGS. 11A and 11B are schematic views showing still another example of the warpage calculation step in the method of measuring the warpage of the rear surface of the substrate in accordance with the present invention.
Figure 11B:
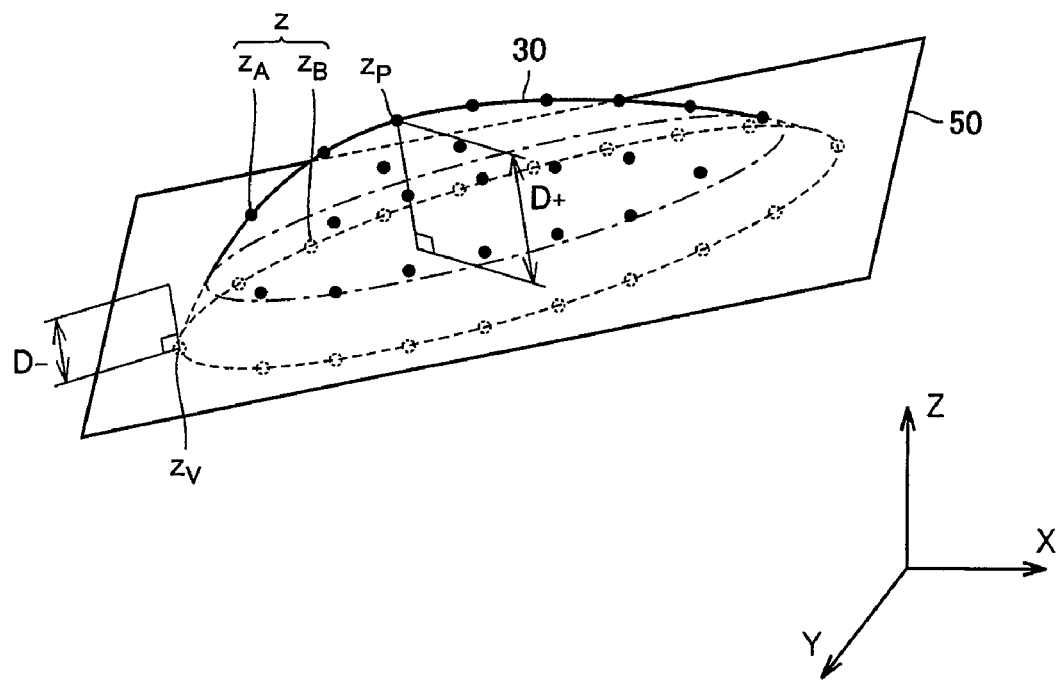

Further, in the present embodiment, referring to FIGS. 6A and 6B, the warpage calculation step S6 calculates as warpage a sum of a distance $D_+$ from best fit plane 50 to a point $z_P$ represented by the greatest displacement value of warped surface 30 on one side with respect to best fit plane 50 and a distance $D_−$ from best fit plane 50 to a point $z_V$ represented by the greatest displacement value of warped surface 30 on the other side with respect to best fit plane 50. There is no particular limitation on such a calculation method. For example, referring to FIG. 11, the warpage calculation step S6 in the present embodiment calculates as warpage a sum of a distance $D_+$ from best fit plane 50 to point $z_P$ represented by the greatest displacement value on one side with respect to best fit plane 50 and a distance D from best fit plane 50 to point $z_V$ represented by the greatest displacement value on the other side with respect to best fit plane 50, in a plurality of points z respectively represented by the plurality of displacement values for calculation subjected to smoothing on warped surface 30. In FIG. 11, a point displaced from best fit plane 50 on one side (including a point on best fit plane 50) is indicated as a point $z_A$, and a point displaced from best fit plane 50 on the other side is indicated as a point $z_B$. With this manner, the average inclination of entire rear surface 10r of substrate 10 represented as best fit plane 50 can be compensated for from warped surface 30, and the warpage of rear surface 10r of substrate 10 can be measured accurately.

The direction of warpage can be indicated using a sign. For example, when the rear surface has a concave warped surface 30 as shown in FIG. 6A, such warpage is referred to as positive (+) warpage, and when the rear surface has a convex warped surface 30 as shown in FIG. 6B, such warpage is referred to as negative (−) warpage.

Second Embodiment

Referring to FIGS. 1 to 3, in another embodiment of the method of measuring warpage of a rear surface of a substrate in accordance with the present invention, a method of measuring warpage of rear surface 10r opposite to crystal growth surface 10c of substrate 10 using laser displacement meter 15 is provided, and substrate 10 is disposed on substrate support table 12. The method includes: the substrate detection step S1 detecting the plurality of displacement values respectively corresponding to the plurality of measurement points 10p on rear surface 10r of substrate 10 using laser displacement meter 15; the noise removal step S2 removing noise contained in the plurality of displacement values; the outer peripheral portion removal step S3 calculating the plurality of displacement values for calculation by removing from the plurality of displacement values those respectively corresponding to the measurement points in the outer peripheral portion of substrate 10; the smoothing step S4 smoothing the plurality of displacement values for calculation to calculate a warped surface; the best fit plane calculation step S5 calculating a best fit plane having the minimum distance to the warped surface; and the warpage calculation step S6 calculating as warpage a sum of a distance from the best fit plane to a point represented by the greatest displacement value of the warped surface on one side with respect to the best fit plane and a distance from the best fit plane to a point represented by the greatest displacement value of the warped surface on the other side with respect to the best fit plane, wherein an optimization cycle C1 including the smoothing step S4, the best fit plane calculation step S5, and the warpage calculation step S6 is repeated one or more times.

By repeating such optimization cycle C1 one or more times, the warped surface of rear surface 10r of substrate 10 can be more smoothed, thereby reducing influence due to surface roughness, and thus the warpage of rear surface 10r can be measured more accurately. In order to measure the warpage of rear surface 10r more accurately, it is preferable that optimization cycle C1 includes the smoothing step S4, the best fit plane calculation step S5, and the warpage calculation step S6 in this order. Further, optimization cycle C1 may include the noise removal step S2 after the smoothing step S4.

Although there is no particular limitation on the number of repeating optimization cycle C1, the number can be set such that a difference between a value of warpage before an optimization cycle and a value of warpage after the optimization cycle is preferably not more than 0.5 μm, and more preferably not more than 0.1 μm. Further, the number can be set such that a ratio of a difference between a value of warpage before an optimization cycle and a value of warpage after the optimization cycle to the value of warpage before the optimization cycle is preferably not more than 0.05, and more preferably not more than 0.01.

Third Embodiment

Referring to FIGS. 1 to 3, in still another embodiment of the method of measuring warpage of a rear surface of a substrate in accordance with the present invention, a method of measuring warpage of rear surface 10r opposite to crystal growth surface 10c of substrate 10 using laser displacement meter 15 is provided, and substrate 10 is disposed on substrate support table 12. The method includes: the substrate detection step S1 detecting the plurality of displacement values respectively corresponding to the plurality of measurement points 10p on rear surface 10r of substrate 10 using laser displacement meter 15; the noise removal step S2 removing noise contained in the plurality of displacement values; the outer peripheral portion removal step S3 calculating the plurality of displacement values for calculation by removing from the plurality of displacement values those respectively corresponding to the measurement points in the outer peripheral portion of substrate 10; the smoothing step S4 smoothing the plurality of displacement values for calculation to calculate a warped surface; the best fit plane calculation step S5 calculating a best fit plane having the minimum distance to the warped surface; and the warpage calculation step S6 calculating as warpage a sum of a distance from the best fit plane to a point represented by the greatest displacement value of the warped surface on one side with respect to the best fit plane and a distance from the best fit plane to a point represented by the greatest displacement value of the warped surface on the other side with respect to the best fit plane, wherein optimization cycle C1 including the smoothing step S4, the best fit plane calculation step S5, and the warpage calculation step S6 is repeated one or more times. The method includes at least one noise removal step S2 in an interval between repeated optimization cycles C1 or after the smoothing step S4 in optimization cycle C1.

By performing at least one noise removal step S2 in an interval between repeated optimization cycles C1, or after the smoothing step S4 in optimization cycle C1, noise contained in the plurality of displacement values can be removed more effectively, and the warpage of rear surface 10r can be measured more accurately.

According to the first to third embodiments, warpage of a rear surface of a substrate can be measured extremely accurately. However, significant efforts are required for processing and analysis of the measured displacement values. Therefore, in the present invention, warpage of a rear surface of a substrate can be measured quickly and accurately by simplifying the processing and analysis of the measured displacement values as described in the following embodiments.

Fourth Embodiment

Figure 7:
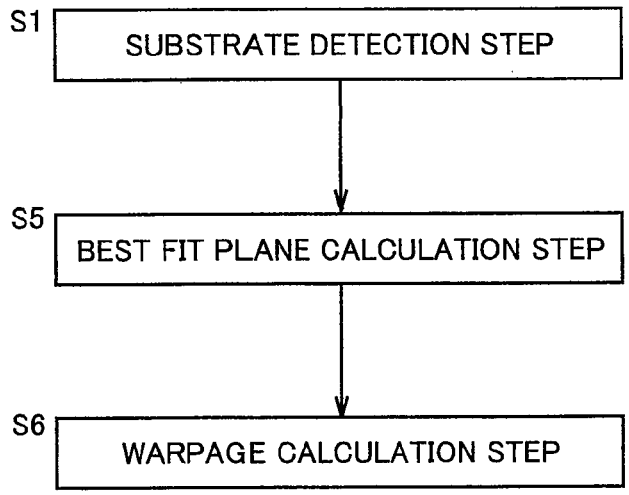
FIG. 7 is a flow chart illustrating another example of the method of measuring the warpage of the rear surface of the substrate in accordance with the present invention.

Referring to FIGS. 2, 3, and 7, in still another embodiment of the method of measuring warpage of a rear surface of a substrate in accordance with the present invention, a method of measuring warpage of rear surface 10r opposite to crystal growth surface 10c of substrate 10 using laser displacement meter 15 is provided, and substrate 10 is disposed on substrate support table 12. The method includes: the substrate detection step S1 detecting the plurality of displacement values respectively corresponding to the plurality of measurement points 10p on rear surface 10r of substrate 10 using laser displacement meter 15; the best fit plane calculation step S5 calculating a best fit plane having the minimum distance to a plurality of points respectively represented by the plurality of displacement values; and the warpage calculation step S6 calculating as warpage a sum of a distance from the best fit plane to a point represented by the greatest displacement value on one side with respect to the best fit plane and a distance from the best fit plane to a point represented by the greatest displacement value on the other side with respect to the best fit plane, in the plurality of points respectively represented by the plurality of displacement values.

Specifically, the present embodiment corresponds to a method of measuring warpage of a rear surface of a substrate in which the noise removal step S2, the outer peripheral portion removal step S3, and the smoothing step S4 are omitted from the method of measuring warpage in the first embodiment including the substrate detection step S1, the noise removal step S2, the outer peripheral portion removal step S3, the smoothing step S4, the best fit plane calculation step S5, and the warpage calculation step S6. Hereinafter, each step will be described. The substrate detection step S1 is the same as that in the first embodiment.

Referring to FIG. 7, in the present embodiment, the best fit plane calculation step S5 is performed subsequent to the substrate detection step S1. Accordingly, the best fit plane calculation step S5 is performed based on the plurality of displacement values detected in the substrate detection step S1. That is, in the best fit plane calculation step S5 in the present embodiment, a best fit plane having the minimum distance to a plurality of points respectively represented by the plurality of displacement values is calculated. Although there is no particular limitation on a method of calculating a best fit plane having the minimum distance to the plurality of points respectively represented by the plurality of displacement values, it is preferable to calculate a best fit plane to minimize a sum of squares of every distance between the best fit plane and each point represented by each of the plurality of displacement values (least square method).

Figure 10A:
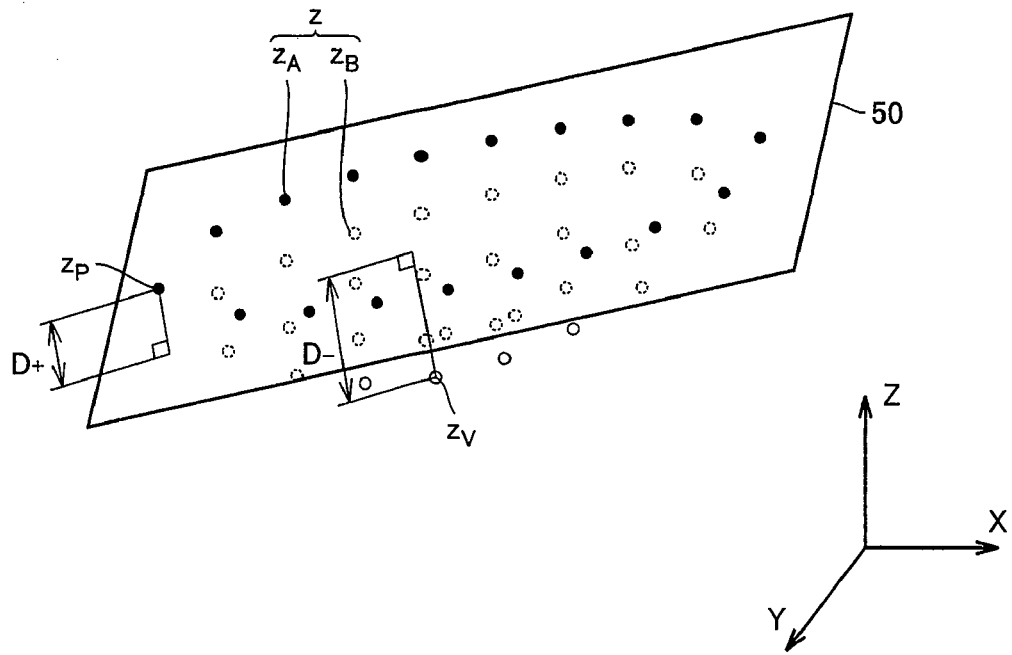
FIGS. 10A and 10B are schematic views showing another example of the warpage calculation step in the method of measuring the warpage of the rear surface of the substrate in accordance with the present invention.
Figure 10B:
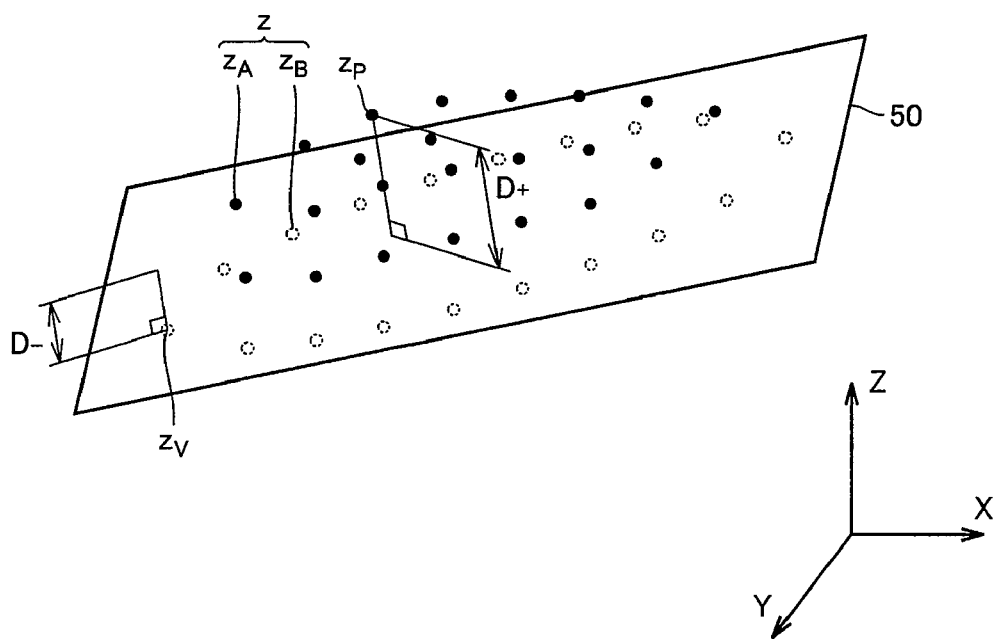

Further, referring to FIG. 7, in the present embodiment, the warpage calculation step S6 is performed subsequent to the best fit plane calculation step S5 performed subsequent to the substrate detection step S1. Accordingly, the warpage calculation step S6 is performed based on the plurality of displacement values detected in the substrate detection step S1 and the best fit plane calculated in the best fit plane calculation step S5. That is, referring to FIGS. 10A and 10B, the warpage calculation step S6 in the present embodiment calculates as warpage a sum of distance $D_+$ from best fit plane 50 to point $z_P$ represented by the greatest displacement value on one side with respect to best fit plane 50 and distance $D_-$ from best fit plane 50 to point $z_V$ represented by the greatest displacement value on the other side with respect to best fit plane 50, in the plurality of points z respectively represented by the plurality of displacement values. In FIGS. 10A and 10B, a point displaced from best fit plane 50 on one side (including a point on best fit plane 50) is indicated as point $z_A$, and a point displaced from best fit plane 50 on the other side is indicated as point $z_B$. With this manner, the average inclination of entire rear surface 10r of substrate 10 represented as best fit plane 50 can be compensated for from the plurality of points z respectively represented by the plurality of displacement values, and the warpage of rear surface 10r of substrate 10 can be measured quickly and accurately.

Fifth Embodiment

Figure 8:
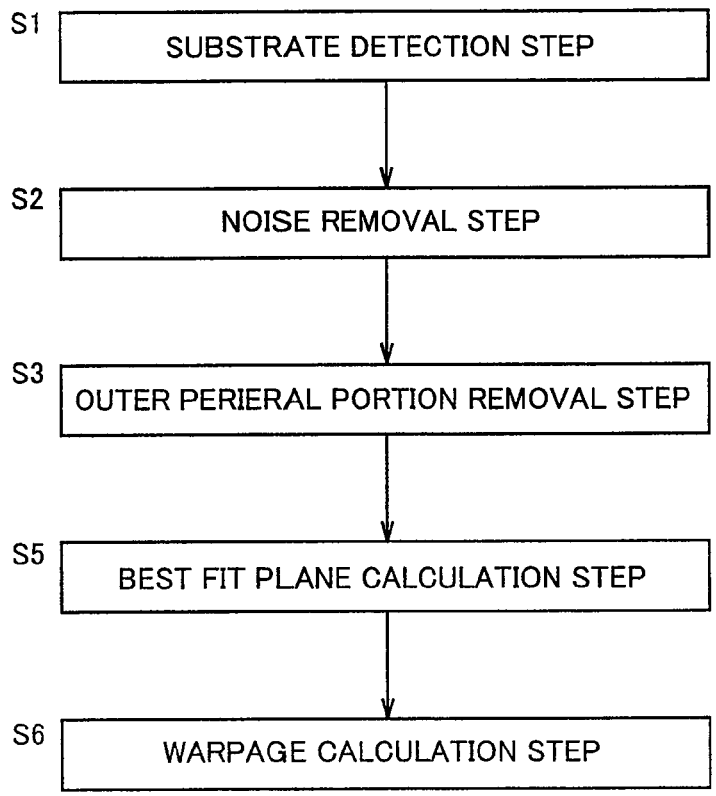
FIG. 8 is a flow chart illustrating still another example of the method of measuring the warpage of the rear surface of the substrate in accordance with the present invention.

Referring to FIG. 8, still another embodiment of the method of measuring warpage of a rear surface of a substrate in accordance with the present invention corresponds to the method of measuring warpage in the fourth embodiment further including after the substrate detection step S1 and before the best fit plane calculation step S5: the noise removal step S2 removing noise contained in the plurality of displacement values; and the outer peripheral portion removal step S3 calculating the plurality of displacement values for calculation by removing from the plurality of displacement values those respectively corresponding to the measurement points in the outer peripheral portion of the substrate, and using the plurality of displacement values for calculation as the plurality of displacement values in the best fit plane calculation step S5 and the warpage calculation step S6.

Specifically, referring to FIGS. 2 to 4 and 8, the method of measuring warpage in the present embodiment is a method of measuring warpage of rear surface 10r opposite to crystal growth surface 10c of substrate 10 using laser displacement meter 15, and substrate 10 is disposed on substrate support table 12. The method includes: the substrate detection step S1 detecting the plurality of displacement values respectively corresponding to the plurality of measurement points 10p on rear surface 10r of substrate 10 using laser displacement meter 15; the noise removal step S2 removing noise contained in the plurality of displacement values; the outer peripheral portion removal step S3 calculating the plurality of displacement values for calculation by removing from the plurality of displacement values those respectively corresponding to the measurement points in the outer peripheral portion of the substrate; the best fit plane calculation step S5 calculating a best fit plane having the minimum distance to a plurality of points respectively represented by the plurality of displacement values for calculation; and the warpage calculation step S6 calculating as warpage a sum of a distance from the best fit plane to a point represented by the greatest displacement value on one side with respect to the best fit plane and a distance from the best fit plane to a point represented by the greatest displacement value on the other side with respect to the best fit plane, in the plurality of points respectively represented by the plurality of displacement values for calculation. Accordingly, the method of measuring warpage in the present embodiment is a method of measuring warpage in which the smoothing step S4 is omitted from the method of measuring warpage in the first embodiment.

Hereinafter, each step will be described. The substrate detection step S1, the noise removal step S2, and the outer peripheral portion removal step S3 are the same as those in the first embodiment. While the present embodiment and FIG. 8 also describe the case where the outer peripheral portion removal step S3 is performed after the noise removal step S2 as in the first embodiment and FIG. 1, these steps may be performed in inverse order.

Referring to FIG. 8, in the present embodiment, the best fit plane calculation step S5 is performed subsequent to the outer peripheral portion removal step S3. Accordingly, the best fit plane calculation step S5 is performed based on the plurality of displacement values for calculation calculated in the outer peripheral portion removal step S3. That is, referring to FIGS. 10A and 10B, in the best fit plane calculation step S5 in the present embodiment, best fit plane 50 having the minimum distance to the plurality of points z respectively represented by the plurality of displacement values for calculation is calculated. Although there is no particular limitation on a method of calculating best fit plane 50 having the minimum distance to the plurality of points z respectively represented by the plurality of displacement values for calculation, it is preferable to calculate best fit plane 50 to minimize a sum of squares of every distance between best fit plane 50 and each point represented by each of the plurality of displacement values (least square method).

Further, referring to FIG. 8, in the present embodiment, the warpage calculation step S6 is performed subsequent to the best fit plane calculation step S5 performed subsequent to the outer peripheral portion removal step S3. Accordingly, the warpage calculation step S6 is performed based on the plurality of displacement values for calculation calculated in the outer peripheral portion removal step S3 and the best fit plane calculated in the best fit plane calculation step S5. That is, referring to FIGS. 10A and 10B, the warpage calculation step S6 in the present embodiment calculates as warpage a sum of distance $D_{30}$ from best fit plane 50 to point $z_P$ represented by the greatest displacement value on one side with respect to best fit plane 50 and distance $D_-$ from best fit plane 50 to point $z_V$ represented by the greatest displacement value on the other side with respect to best fit plane 50, in the plurality of points z respectively represented by the plurality of displacement values for calculation. In FIGS. 10A and 10B, a point displaced from best fit plane 50 on one side (including a point on best fit plane 50) is indicated as point $z_A$, and a point displaced from best fit plane 50 on the other side is indicated as point $z_B$.

With this manner, the average inclination of entire rear surface 10r of substrate 10 represented as best fit plane 50 can be compensated for from the plurality of points z respectively represented by the plurality of displacement values for calculation, and the warpage of rear surface 10r of substrate 10 can be measured quickly and accurately. Since the noise removal step S2 and the outer peripheral portion removal step S3 are added in the present embodiment compared to the fourth embodiment, the warpage of the rear surface of the substrate can be measured more accurately. Further, in the present embodiment, as in the first embodiment, it is preferable that the substrate is disposed on the substrate support table having three supporting portions such that the crystal growth surface of the substrate is supported by the three supporting portions, that the substrate detection step S1 is performed by measuring distances between the laser displacement meter and the plurality of measurement points on the rear surface by a laser focus technique while moving the substrate support table on which the substrate is disposed in a two-dimensional direction in a stepwise fashion, and that the noise removal step S2 is performed using a median filter.

Sixth Embodiment

Figure 9:
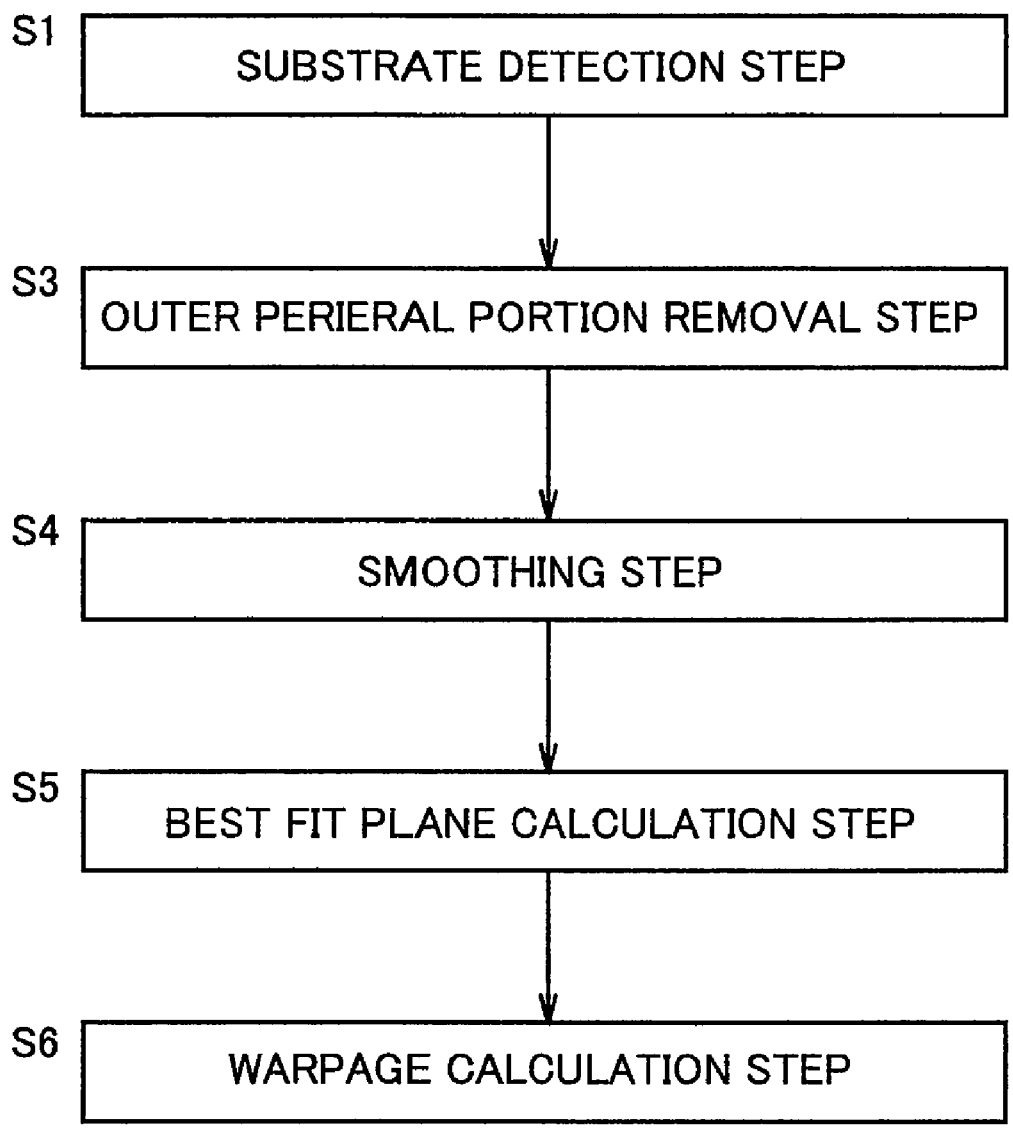
FIG. 9 is a flow chart illustrating still another example of the method of measuring the warpage of the rear surface of the substrate in accordance with the present invention.

Referring to FIG. 9, still another embodiment of the method of measuring warpage of a rear surface of a substrate in accordance with the present invention corresponds to the method of measuring warpage in the fourth embodiment further including after the substrate detection step S1 and before the best fit plane calculation step S5: the outer peripheral portion removal step S3 calculating the plurality of displacement values for calculation by removing from the plurality of displacement values those respectively corresponding to the measurement points in the outer peripheral portion of the substrate; and the smoothing step S4 smoothing the plurality of displacement values for calculation to calculate a warped surface, and using the plurality of points respectively represented by the plurality of displacement values for calculation subjected to smoothing on the warped surface as the plurality of points respectively represented by the plurality of displacement values in the best fit plane calculation step S5 and the warpage calculation step S6.

Specifically, referring to FIGS. 2 to 4 and 9, the method of measuring warpage in the present embodiment is a method of measuring warpage of rear surface 10r opposite to crystal growth surface 10c of substrate 10 using laser displacement meter 15, and substrate 10 is disposed on substrate support table 12. The method includes: the substrate detection step S1 detecting the plurality of displacement values respectively corresponding to the plurality of measurement points 10p on rear surface 10r of substrate 10 using laser displacement meter 15; the outer peripheral portion removal step S3 calculating the plurality of displacement values for calculation by removing from the plurality of displacement values those respectively corresponding to the measurement points in the outer peripheral portion of the substrate; the smoothing step S4 smoothing the plurality of displacement values for calculation to calculate a warped surface; the best fit plane calculation step S5 calculating a best fit plane having the minimum distance to a plurality of points respectively represented by the plurality of displacement values for calculation subjected to smoothing on the warped surface; and the warpage calculation step S6 calculating as warpage a sum of a distance from the best fit plane to a point represented by the greatest displacement value on one side with respect to the best fit plane and a distance from the best fit plane to a point represented by the greatest displacement value on the other side with respect to the best fit plane, in the plurality of points respectively represented by the plurality of displacement values for calculation subjected to smoothing on the warped surface. Accordingly, the method of measuring warpage in the present embodiment is a method of measuring warpage in which the noise removal step S2 is omitted from the method of measuring warpage in the first embodiment.

Hereinafter, each step will be described. The substrate detection step S1, the outer peripheral portion removal step S3, and the smoothing step S4 are the same as those in the first embodiment.

Referring to FIG. 9, in the present embodiment, the best fit plane calculation step S5 is performed subsequent to the smoothing step S4. Accordingly, as in the first embodiment, the best fit plane calculation step S5 is performed based on the plurality of displacement values for calculation subjected to smoothing on the warped surface calculated in the smoothing step S4. That is, referring to FIGS. 11A and 11B, in the best fit plane calculation step S5 in the present embodiment, best fit plane 50 having the minimum distance to the plurality of points z respectively represented by the plurality of displacement values for calculation subjected to smoothing on warped surface 30 is calculated. Although there is no particular limitation on a method of calculating best fit plane 50 having the minimum distance to the plurality of points z respectively represented by the plurality of displacement values for calculation subjected to smoothing on warped surface 30, it is preferable to calculate best fit plane 50 to minimize a sum of squares of every distance between best fit plane 50 and each point represented by each of the plurality of displacement values for calculation subjected to smoothing on warped surface 30 (least square method).

Further, referring to FIG. 9, in the present embodiment, the warpage calculation step S6 is performed subsequent to the best fit plane calculation step S5 performed subsequent to the smoothing step S4. Accordingly, the warpage calculation step S6 is performed based on the plurality of displacement values for calculation subjected to smoothing on the warped surface calculated in the smoothing step S4 and the best fit plane calculated in the best fit plane calculation step S5. That is, referring to FIGS. 11A and 11B, the warpage calculation step S6 in the present embodiment calculates as warpage a sum of distance $D_+$ from best fit plane 50 to point $z_P$ represented by the greatest displacement value on one side with respect to best fit plane 50 and distance $D_-$ from best fit plane 50 to point $z_V$ represented by the greatest displacement value on the other side with respect to best fit plane 50, in the plurality of points z respectively represented by the plurality of displacement values for calculation subjected to smoothing on warped surface 30, In FIGS. 11A and 11B, the point displaced from best fit plane 50 on one side (including a point on best fit plane 50) is indicated as point $z_A$, and the point displaced from best fit plane 50 on the other side is indicated as point $z_B$.

With this manner, the average inclination of entire rear surface 10r of substrate 10 represented as best fit plane 50 can be compensated for from the plurality of points z respectively represented by the plurality of displacement values for calculation subjected to smoothing on warped surface 30, and the warpage of rear surface 10r of substrate 10 can be measured quickly and accurately. Since the outer peripheral portion removal step S3 and the smoothing step S4 are added in the present embodiment compared to the fourth embodiment, the warpage of the rear surface of the substrate can be measured more accurately. Further, in the present embodiment, as in the first embodiment, it is preferable that the substrate is disposed on the substrate support table having three supporting portions such that the crystal growth surface of the substrate is supported by the three supporting portions, that the substrate detection step S1 is performed by measuring distances between the laser displacement meter and the plurality of measurement points on the rear surface by a laser focus technique while moving the substrate support table on which the substrate is disposed in a two-dimensional direction in a stepwise fashion, and that the smoothing step S4 is performed using a Gaussian filter.

EXAMPLES

First Comparative Example

Warpage of a rear surface of a GaN substrate measuring 5.08 cm (2 inches) in diameter by 400 μm in thickness and having a surface roughness Ra of a crystal growth surface of 1.5 nm and a surface roughness Ra of the rear surface of 42 nm was measured using a flatness tester employing optical interferometry (FT-17 (optical output unit) and FA-200 (analysis unit) manufactured by NIDEK Co., Ltd.). A semiconductor laser having a laser wavelength of 655 nm was used for the flatness tester. The measurement points for measuring the displacement values were arranged with a pitch of about 100 μm, and displacements at about 70650 measurement points were analyzed. The rear surface of the GaN substrate had a warpage of 8.5 μm.

The surface roughnesses Ra of the crystal growth surface and the rear surface of the GaN substrate were calculated by: performing measurement in a range of 750 μm×700 μm using a laser displacement meter employing the laser focus technique and in a range of 100 μm×80 μm using a 3D-SEM, respectively; sampling a portion having a reference length from a roughness curve arbitrarily specified in each measurement range, in a direction of a mean line of the roughness curve; summing up absolute values of deviations from a mean line of the sampled portion to a measurement curve; and calculating an average for the reference length.

First Example

Warpage of a rear surface of a GaN substrate identical to that in the first comparative example was measured using a laser displacement meter employing the laser focus technique (LT-9010 (laser output unit) and LT-9500 (laser control unit) manufactured by Keyence Corporation), an XY position controller (CP-500 manufactured by COMS Co., Ltd.), and a data analysis apparatus (CA-800 manufactured by COMS Co., Ltd.). A red color semiconductor laser having a laser wavelength of 670 nm was used for the laser displacement meter.

Referring to FIGS. 1 to 3, firstly the GaN substrate (substrate 10) was disposed on substrate support table 12 such that the outer peripheral portion of crystal growth surface 10c thereof was supported by three supporting portions 12h. Then, laser displacement meter 15 was used to detect a plurality of displacement values respectively corresponding to the plurality of measurement points 10p on rear surface 10r of the GaN substrate (substrate 10) (the substrate detection step S1). On this occasion, measurement points 10p were arranged with pitch P of 700 μm, and a plurality of displacement values respectively corresponding to about 5000 measurement points 10p was measured. Next, noise contained in the plurality of displacement values was removed using an 8-neighborhood median filter (the noise removal step S2). Thereafter, a plurality of displacement values for calculation was calculated by removing from the plurality of displacement values those respectively corresponding to up to three measurement points inward from outer periphery 10e of substrate 10 (the outer peripheral portion removal step S3).

Then, the plurality of displacement values for calculation was smoothed using the 8-neighborhood Gaussian filter with σ=5 after normalization shown in FIG. 5C to calculate a warped surface (the smoothing step S4). Next, a best fit plane was calculated to minimize the sum of squares of every distance between the best fit plane and each point represented by each of the plurality of displacement values for calculation subjected to smoothing (the best fit plane calculation step S5). Thereafter, the sum of a distance from the best fit plane to a point represented by the greatest displacement value of the warped surface on one side with respect to the best fit plane and a distance from the best fit plane to a point represented by the greatest displacement value of the warped surface on the other side with respect to the best fit plane was calculated as warpage (the warpage calculation step S6). The warpage calculated as described above was 9.0 μm.

Next, noise contained in the plurality of displacement values for calculation was removed using the 8-neighborhood median filter again (the noise removal step S2). Thereafter, the optimization cycle performing the smoothing step S4, the best fit plane calculation step S5, and the warpage calculation step S6 in this order was repeated once. The warpage calculated as described above was 8.5 μm.

Then, the above optimization cycle was repeated once more. The warpage calculated as described above was 8.3 μm, having a difference of not more than 0.5 μm from the previously calculated warpage. Therefore, the optimization cycle was ended, and the rear surface of the substrate was determined to have a warpage of 8.3 μm.

As seen from the comparison between the first example and the first comparative example, the warpage obtained by the method of measuring warpage in accordance with the present invention was almost identical to the warpage obtained by the measurement using a conventional flatness tester employing optical interferometry. Thereby, it was confirmed that warpage of a rear surface of a substrate can be measured accurately by the method of measuring warpage in accordance with the present invention.

Second Comparative Example

An attempt was made to measure warpage of a rear surface of a GaN substrate measuring 5.08 cm (2 inches) in diameter by 400 μm in thickness and having a surface roughness Ra of a crystal growth surface of 3 nm and a surface roughness Ra of the rear surface of 57 nm, using the same flatness tester employing optical interferometry as that in the first comparative example, in a manner similar to the first comparative example. However, since the surface to be measured was rough and thus scattered light, interference fringes required to perform the measurement failed to be obtained. Therefore, the measurement of the warpage of the rear surface failed to be performed.

Second Example

Warpage of a rear surface of a GaN substrate identical to that in the second comparative example was measured in a manner similar to the first example. The warpage calculated after the first warpage calculation step S6 was 10.9 μm. Then, the noise removal step S2 was performed, and thereafter the optimization cycle similar to that in the first example was repeated once. The warpage calculated after the second warpage calculation step S6 was 10.2 μm. Then, the above optimization cycle was repeated once more. The warpage calculated after the third warpage calculation step S6 was 10.0 μm, having a difference of not more than 0.5 μm from the previously calculated warpage. Therefore, the optimization cycle was ended, and the rear surface of the substrate was determined to have a warpage of 10.0 μm.

As seen from the comparison between the second example and the second comparative example, in the case where a substrate has a rough rear surface with a surface roughness Ra of not less than 50 nm, the method of measuring warpage in accordance with the present invention was capable of measuring the warpage of the rough rear surface of the substrate, whereas the measuring method using a conventional flatness tester employing optical interferometry failed to measure the warpage of the rough rear surface of the substrate.

Third Example

Warpage of a rear surface of a GaN substrate identical to that in the second example was measured using a laser displacement meter employing the laser focus technique (LT-9010 (laser output unit) and LT-9500 (laser control unit) manufactured by Keyence Corporation), an XY position controller (CP-500 manufactured by COMS Co., Ltd.), and a data analysis apparatus (CA-800 manufactured by COMS Co., Ltd.). A red color semiconductor laser having a laser wavelength of 670 nm was used for the laser displacement meter.

Referring to FIGS. 2, 3 and 7, firstly the GaN substrate (substrate 10) was disposed on substrate support table 12 such that the outer peripheral portion of crystal growth surface 10c thereof was supported by three supporting portions 12h. Then, laser displacement meter 15 was used to detect a plurality of displacement values respectively corresponding to the plurality of measurement points 10p on rear surface 10r of the GaN substrate (substrate 10) (the substrate detection step S1). On this occasion, measurement points 10p were arranged with pitch P of 700 µm, and a plurality of displacement values respectively corresponding to about 5000 measurement points 10p was measured. Next, a best fit plane was calculated to minimize the sum of squares of every distance between the best fit plane and each point represented by each of the plurality of displacement values (the best fit plane calculation step S5). Thereafter, the sum of a distance from the best fit plane to a point represented by the greatest displacement value on one side with respect to the best fit plane and a distance from the best fit plane to a point represented by the greatest displacement value on the other side with respect to the best fit plane, in the plurality of points respectively represented by the plurality of displacement values, was calculated as warpage (the warpage calculation step S6). The warpage calculated as described above was 11.5 µm.

Fourth Example

Warpage of a rear surface of a GaN substrate identical to that in the second example was measured as described below. Referring to FIG. 8, the substrate detection step S1 was performed as in the third example. Next, noise contained in the plurality of displacement values was removed using an 8-neighborhood median filter (the noise removal step S2). Thereafter, a plurality of displacement values for calculation was calculated by removing from the plurality of displacement values those respectively corresponding to up to three measurement points inward from outer periphery 10e of substrate 10 (the outer peripheral portion removal step S3). Next, a best fit plane was calculated to minimize the sum of squares of every distance between the best fit plane and each point represented by each of the plurality of displacement values for calculation (the best fit plane calculation step S5). Thereafter, the sum of a distance from the best fit plane to a point represented by the greatest displacement value on one side with respect to the best fit plane and a distance from the best fit plane to a point represented by the greatest displacement value on the other side with respect to the best fit plane, in the plurality of points respectively represented by the plurality of displacement values for calculation, was calculated as warpage (the warpage calculation step S6). The warpage calculated as described above was 11.1 µm.

Fifth Example

Warpage of a rear surface of a GaN substrate identical to that in the second example was measured as described below. Referring to FIG. 9, the substrate detection step S1 was performed as in the third example. Thereafter, a plurality of displacement values for calculation was calculated by removing from the plurality of displacement values those respectively corresponding to up to three measurement points inward from outer periphery 10e of substrate 10 (the outer peripheral portion removal step S3). Then, the plurality of displacement values for calculation was smoothed using the 8-neighborhood Gaussian filter with σ=5 after normalization shown in FIG. 5C to calculate a warped surface (the smoothing step S4). Next, a best fit plane was calculated to minimize the sum of squares of every distance between the best fit plane and each point represented by each of the plurality of displacement values for calculation subjected to smoothing on the warped surface (the best fit plane calculation step S5). Thereafter, the sum of a distance from the best fit plane to a point represented by the greatest displacement value on one side with respect to the best fit plane and a distance from the best fit plane to a point represented by the greatest displacement value on the other side with respect to the best fit plane, in the plurality of points respectively represented by the plurality of displacement values for calculation subjected to smoothing on the warped surface, was calculated as warpage (the warpage calculation step S6). The warpage calculated as described above was 11.2 µm.

As is clear from the third to fifth examples, it was possible to measure warpage of a rear surface of a substrate quickly and accurately in a simple and easy way, also in the measuring method including the substrate detection step S1, the best fit plane calculation step S5, and the warpage calculation step S6 (the third example); the measuring method of the third example further including the noise removal step S2 and the outer peripheral portion removal step S3 (the fourth example); and the measuring method of the third example further including the outer peripheral portion removal step S3 and the smoothing step S4 (the fifth example).

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A method of measuring warpage of a rear surface opposite to a crystal growth surface of a substrate using a laser displacement meter, said substrate being disposed on a substrate support table, the method comprising steps of:

detecting a plurality of displacement values respectively corresponding to a plurality of measurement points on said rear surface of said substrate using said laser displacement meter;

calculating a plurality of displacement values for calculation by removing from said plurality of displacement values those respectively corresponding to the measurement points in an outer peripheral portion of said substrate;

smoothing said plurality of displacement values for calculation to calculate a warped surface;
calculating a best fit plane having the minimum distance to said warped surface; and
calculating as warpage a sum of a distance from said best fit plane to a point represented by the greatest displacement value of said warped surface on one side with respect to said best fit plane and a distance from said best fit plane to a point represented by the greatest displacement value of said warped surface on the other side with respect to said best fit plane, wherein
an optimization cycle including said smoothing step, said best fit plane calculation step, and said warpage calculation step is repeated one or more times.

2. The method of measuring warpage of a rear surface of a substrate according to claim 1, further comprising: at least one noise removal step removing noise contained in said plurality of displacement values is included in an interval between said repeated optimization cycles, or after said smoothing step in said optimization cycle.

* * * * *